(12) United States Patent
Ożóg (10) Patent No.: US 11,840,346 B2
(45) Date of Patent: Dec. 12, 2023

(54) STRUT FOR AIRCRAFT ENGINE (71) Applicant: PRATT & WHITNEY CANADA CORP., Longueuil (CA)

(72) Inventor: Mateusz Ożóg, Hucisko (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/656,667

(22) Filed: Mar. 28, 2022

(65) Prior Publication Data

US 2023/0303256 A1    Sep. 28, 2023

(51) Int. Cl.
*F02C 7/04* (2006.01)
*B64D 27/10* (2006.01)
*B64D 33/02* (2006.01)
B64D 27/26 (2006.01)

(52) U.S. Cl.
CPC ............ B64D 27/10 (2013.01); B64D 33/02 (2013.01); F02C 7/04 (2013.01); *B64D 2027/262* (2013.01); *B64D 2033/0293* (2013.01)

(58) Field of Classification Search
CPC .. B64D 27/10; B64D 33/02; B64D 2027/262; B64D 2033/0293; F02C 7/04; F01D 9/02; F01D 17/02
See application file for complete search history.

(56) References Cited

U.S. PATENT DOCUMENTS 2,946,221 A * 7/1960 Annear .................... F01D 17/08
73/861.65
4,047,379 A * 9/1977 Brookes ............... G01K 13/028
374/135

| 4,050,306 | A | 9/1977 | Khalid |
| 4,433,584 | A | 2/1984 | Kokoszka et al. |
| 4,765,751 | A | 8/1988 | Pannone et al. |
| 5,394,689 | A | 3/1995 | D'Onofrio |
| 6,402,470 | B1 | 6/2002 | Kvasnak et al. |
| 6,813,942 | B1 | 11/2004 | Vozhdaev et al. |
| 7,527,471 | B2 | 5/2009 | Schilling |
| 8,002,525 | B2 | 8/2011 | Whalley |
| 9,970,316 | B2 | 5/2018 | Radeljak et al. |
| 10,822,961 | B2 | 11/2020 | Coudert et al. |
| 11,280,214 | B2 | 3/2022 | Carr et al. |
| 2023/0134390 | A1 | 5/2023 | Le Pape et al. |

FOREIGN PATENT DOCUMENTS

| CN | 112665861 | 4/2021 |
| CN | 113449475 | 9/2021 |
| EP | 4177442 A1 | 5/2023 |
| GB | 2252131 | 7/1992 |

OTHER PUBLICATIONS

European Search Report issued in counterpart application 23164829.6 dated Jun. 26, 2023.

* cited by examiner

*Primary Examiner* — Steven M Sutherland
(74) *Attorney, Agent, or Firm* — NORTON ROSE FULBRIGHT CANADA LLP (57) ABSTRACT An aircraft engine includes an air inlet duct and at least one strut having a leading edge and a trailing edge. The at least one strut extends across at least part of the air inlet duct and has a strut passage. The trailing edge has one or more edge contours, each defining a contour edge wall recessed from a baseline surface of the trailing edge. The one or more edge contours have a recessed tap in fluid communication with the strut passage.

19 Claims, 11 Drawing Sheets

STRUT FOR AIRCRAFT ENGINE

TECHNICAL FIELD

The disclosure relates generally to aircraft engines and, more particularly, to struts.

BACKGROUND

Struts in aircraft engines are subjected to various stresses and loading forces. This may pose structural challenges such as premature wear when instrumentation passages and the like are integrated with the strut.

SUMMARY

In one aspect, there is provided an aircraft engine, comprising: an air inlet duct; and at least one strut having a leading edge and a trailing edge and extending across at least part of the air inlet duct, the at least one strut having a strut passage, the trailing edge having one or more edge contours each defining a contour edge wall recessed from a baseline surface of the trailing edge, the one or more edge contours having a recessed tap in fluid communication with the strut passage.

In another aspect, there is provided a strut extending across at least part of a gas path of an aircraft engine, the strut comprising: a strut body having a leading edge and a trailing edge; and an internal strut passage within the strut body, the internal strut passage in fluid communication with one or more recessed taps disposed in respective one or more edge contours in the trailing edge defining a contour edge wall recessed from a baseline surface of the trailing edge.

BRIEF DESCRIPTION OF THE DRAWINGS

Reference is now made to the accompanying figures in which:

FIG. 3 is a schematic view of an exemplary undercut in a strut suitable for use in one of the engines shown in FIGS. 1A-1C;

DETAILED DESCRIPTION

Figure 1A:
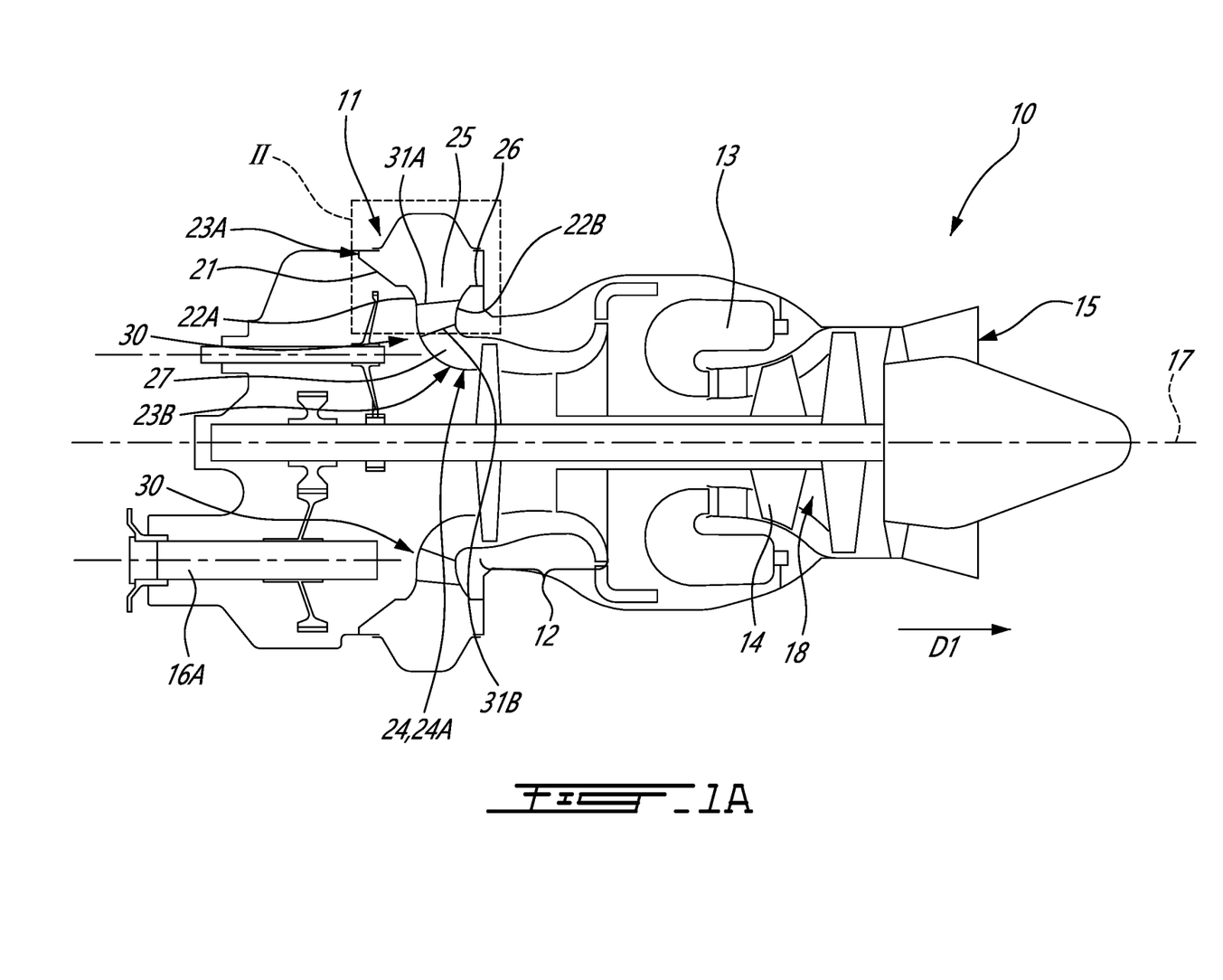
FIG. 1A is a schematic cross sectional view of a gas turbine engine.
Figure 1B:
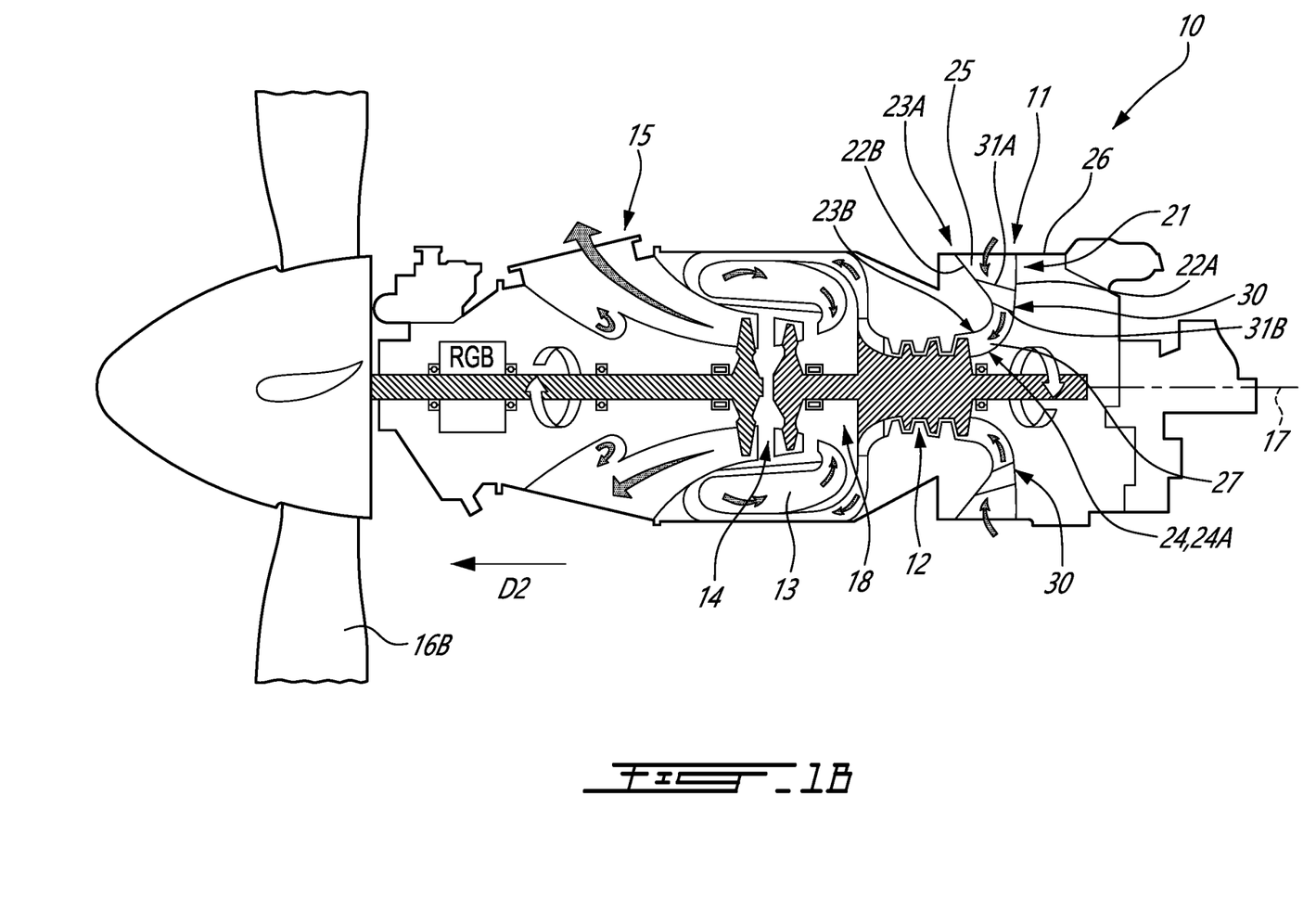
FIG. 1B is a schematic cross sectional view of another gas turbine engine.
Figure 1C:
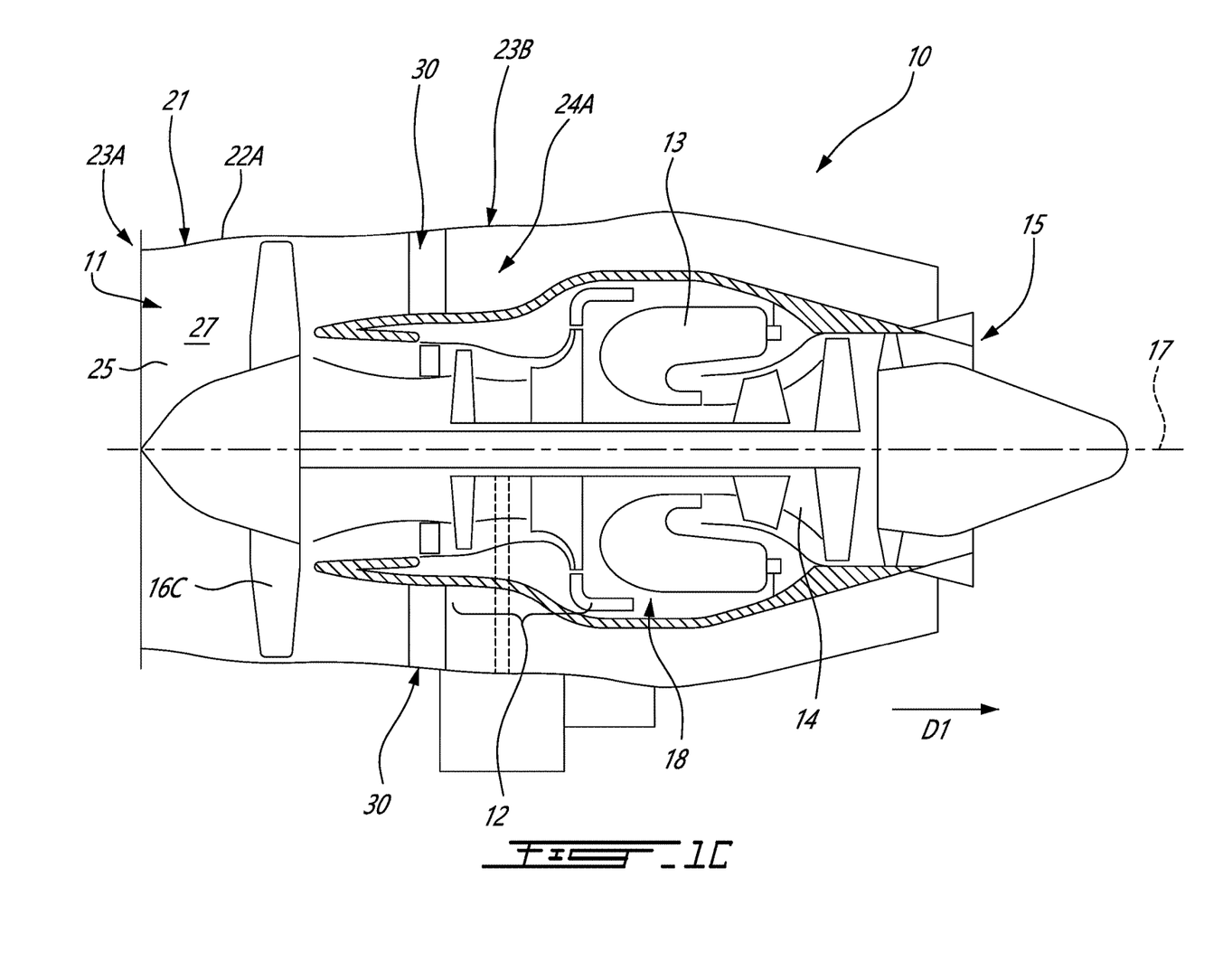
FIG. 1C is a schematic cross sectional view of still another gas turbine engine.

FIGS. 1A to 1C illustrate different gas turbine engines 10 of a type preferably provided for use in subsonic flight. Each of the gas turbine engines 10 generally comprises in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, and an exhaust outlet 15 through which the combustion gases exit the gas turbine engine 10. The gas turbine engines 10 have a longitudinal center axis 17 about which components rotate. In the gas turbine engines 10 shown in FIGS. 1A and 1C, the air inlet 11 is positioned forward of the compressor section 12, whereas in the gas turbine engine 10 shown in FIG. 1B, the air inlet 11 is positioned aft of the compressor section 12. The gas turbine engine 10 of FIG. 1A includes a driven gear train 16A mounted at a front end of the gas turbine engine 10, and is an example of a "turboshaft" gas turbine engine 10. The gas turbine engine 10 of FIG. 1B includes a propeller 16B which provides thrust for flight and taxiing, and is an example of a "turboprop" gas turbine engine 10. The gas turbine engine 10 of FIG. 1C includes a fan 16C which provides thrust for flight, and is an example of a "turbofan" gas turbine engine 10. The present disclosure may also apply to other types of aircraft engines, for instance hybrid-electric aircraft engines.

The gas turbine engines 10 (sometimes referred to herein simply as "engines 10") have a central core 18 through which gases flow and which includes some of the turbomachinery of the engine 10. The engine 10 of FIG. 1B is a "reverse-flow" engine 10 because gases flow through the core 18 from the air inlet 11 at a rear portion, to the exhaust outlet 15 at a front portion. This is in contrast to "through-flow" gas turbine engines 10, such as those shown in FIGS. 1A and 10, in which gases flow through the core 18 of the engine 10 from a front portion to a rear portion. The direction of the flow of gases through the core 18 of the engine 10 of FIG. 1B can be better appreciated by considering that the gases flow through the core 18 in the same direction D2 as the one along which the engine 10 travels during flight for the engine. Stated differently, gases flow through the engine 10 of FIG. 1B from a rear end towards a front end in the direction of the propeller 16B. The direction of the flow of gases through the core 18 of the engines 10 of FIGS. 1A and 10 can be better appreciated by considering that the gases flow through the core 18 in a direction D1 that is opposite to the direction one along which the engines 10 travel during flight for the engines. Stated differently, gases flow through the engines 10 of FIGS. 1A and 10 from a front end towards a rear end in the direction of the exhaust outlet 15. The engines 10 of FIGS. 1A to 1C may have one or multiple spools which perform compression to pressurize the air received through the air inlet 11, and which extract energy from the combustion gases before they exit the core 18 via the exhaust outlet 15. The spools and this engine architecture are described in greater detail in U.S. patent application Ser. No. 15/266,321 filed on Sep. 15, 2016, the entire contents of which are hereby incorporated by reference.

It will thus be appreciated that the expressions "forward" and "aft" used herein refer to the relative disposition of components of the engines 10, in correspondence to the "forward" and "aft" directions of the engines 10 and aircraft including the engines 10 as defined with respect to the direction of travel. In FIGS. 1A and 10, a component of the engines 10 that is "forward" of another component is arranged within the engine 10 such that it is located closer to the air inlet 11. Similarly, a component of the engines 10 in FIGS. 1A and 10 that is "aft" of another component is arranged within the engines 10 such that it is further away from the air inlet 11. In FIG. 1B, a component of the engine 10 that is "forward" of another component is arranged within the engine 10 such that it is located closer to the propeller 16B.

Referring to FIGS. 1A to 1C, the air inlet 11 is the first point of entry of air into the core 18 of the engine 10. The air inlet 11 has, or is defined by, an air inlet duct 21 along which air flows as it drawn into the engine 10. The inlet duct 21 may take different forms, as described in greater detail below.

Referring to FIGS. 1A and 1B, the air inlet 11 is a radial air inlet 11 because, during operation of the engines 10, air is drawn into the engine via the air inlet 11 along a substantially radial direction. The inlet duct 21 is defined by two annular walls 22A, 22B with sections that extend along substantially radial directions relative to the center axis 17. Each wall 22A, 22B is shown as being an integral body. In an alternate embodiment, one or both of the walls 22A, 22B is made up of wall segments. Each annular wall 22A, 22B extends between a radially-outer portion 23A and a radially-inner portion 23B. The radially-inner portion 23B is a portion of each wall 22A, 22B that is radially inward (i.e. closer to the center axis 17 of the engine 10) than the radially-outer portion 23A. Each wall 22A, 22B therefore extends from an outer surface or portion of the engine 10 radially inwards toward the core 18. The walls 22A, 22B in the depicted embodiment also have portions extending in an axial direction relative to the center axis 17. The radially-inner portions 23B of each wall 22A, 22B have trailing ends 24 which, in the frame of reference of the engine 10, are defined by both axial and radial direction vectors. An air opening or inlet 25 is defined at the radially-outer portions 23A of the walls 22A, 22B. The inlet 25 is circumferential because it spans a portion or all of the circumference of the inlet duct 21. The inlet 25 extends through an outermost surface 26 of the engine 10. The outermost surface 26 may be defined by an engine covering, such as a nacelle or casing. The inlet 25 may be provided with a screen, filter, or mesh to prevent the ingress of foreign objects into the engine 10. The inlet duct 21 extends from the inlet 25 in a radially-inward direction to an outlet 24A of the inlet duct 21 which is defined by the radially-inner portions 23B of each wall 22A, 22B. The outlet 24A is within the engines 10 and forms part of their cores 18.

Referring to FIGS. 1A and 1B, the walls 22A, 22B are axially spaced apart from one another. In FIG. 1A, the wall 22B is aft of the wall 22A in a direction along the center axis 17. In FIG. 1B, the wall 22B is forward of the wall 22A in a direction along the center axis 17. The axial offset between the annular walls 22A, 22B defines an inner volume of the inlet duct 21 through which air is conveyed toward the compressor section 12. The spaced-apart walls 22A, 22B therefore define an annular air passage 27 between them. The air passage 27 is an annular volume that extends radially inwardly at the radially-outer portions 23A and which has both axial and radial direction vectors at the radially-inner portion 23B of the walls 22A, 22B.

Referring to FIG. 10, the air inlet 11 is an axial air inlet 11 because, during operation of the engine 10, air is drawn into the engine via the air inlet 11 along a substantially axial direction. The inlet duct 21 is defined by an annular wall 22A that extends along substantially an axial direction relative to the center axis 17. The wall 22A is shown as being an integral body. In an alternate embodiment, the wall 22A is made up of wall segments. The annular wall 22A extends between an axially-outer portion 23A and an axially-inner portion 23B. The axially-inner portion 23B is a portion of the wall 22A that is axially inward (i.e. closer to the compressor section 12 the engine 10) than the axially-outer portion 23A. The wall 22A therefore extends from an outer surface or portion of the engine 10 axially inwards toward the core 18. An inlet 25 is defined at the axially-outer portion 23A of the wall 22A. The inlet 25 is circumferential because it spans a portion or all of the circumference of the inlet duct 21. The wall 22A defines an annular air passage 27. The air passage 27 is an annular volume that extends axially inwardly at the axially-outer portions 23A. The inlet duct 21 extends from the inlet 25 in a axially-inward direction to an outlet 24A of the inlet duct 21 which is defined by the axially-inner portion 23B of the wall 22A. The outlet 24A is within the engine 10 and forms part of the core 18.

The air inlets 11 of the engines 10 of FIGS. 1A to 1C include structural supports, or struts 30. The struts 30 may take different forms.

Referring to the radial air inlets 11 of FIGS. 1A and 1B, multiple air inlet struts 30 are located within the inlet duct 21. Each strut 30 is part of the fixed structure of the engine 10. Each strut 30 is a stationary component that helps to provide structure to the air inlet 11. The struts 30 are circumferentially spaced-apart from one another about the center axis 17 within the inlet duct 21. Each strut 30 extends across the inlet duct 21 between the annular walls 22A, 22B and through the annular air passage 27. Each strut 30 is attached to the annular walls 22A, 22B. In the depicted embodiment, each strut 30 is integral with the walls 22A, 22B. In an alternate embodiment, one or more of the struts 30 can be removably mounted to the walls 22A, 22B. Each of the struts 30 in the depicted embodiment is a radial air inlet strut 30 because it extends radially inwardly. Stated differently, each strut 30 has a radial span defined between a radially-outer edge which defines the leading edge 31A of the strut 30 near the radially-outer portions 23A of the walls 22A, 22B, and a radially-inner edge which defines the trailing edge 31B near the radially-inner portions 23B of the walls 22A, 22B. Some or all of the trailing edge 31B is radially closer to the center axis 17 than the leading edge 31A. The position of the edges 31A, 31B of the strut 30 relative to the engine 10 may vary, and what remains constant is that the trailing edge 31B is downstream of the leading edge 31A relative to the flow of air over the strut 30. Referring to FIGS. 1A and 1B, each strut 30 also has an axial span defined between the annular walls 22A, 22B of the inlet duct 21.

Referring to FIGS. 1A and 1B, one or more of the struts 30 has a body shaped like an airfoil. The airfoil shape of the strut 30 helps to guide the flow of air through the air inlet 11. Each airfoil-shaped strut 30 includes the leading edge 31A, and the trailing edge 31B. The trailing edge 31B is radially closer to the center axis 17 than the leading edge 31A along some or all of its length. The strut 30 may be positioned radially inwardly of the inlet 25 and radially outwardly of the outlet 24A. The strut 30 is positioned downstream of the inlet 25 and upstream of the outlet 24A, relative to the direction of flow across the strut 30 from the leading edge 31A to the trailing edge 31B. In an embodiment, the strut 30 is positioned at or adjacent to the inlet 25. The chord C of the strut 30 is therefore defined along a line extending between the leading and trailing edges 31A, 31B (see FIG. 2). The chord C therefore extends in a substantially radial direction. By "substantially radial", it is understood that in the frame of reference of the engine 10, the magnitude of the radial direction vector of the chord C may be much greater than the magnitude of the axial direction vector of the chord C. The chord C may have a camber or stagger angle. In alternate embodiments, one or more of the struts 30 do not have an airfoil shape.

Figure 2:
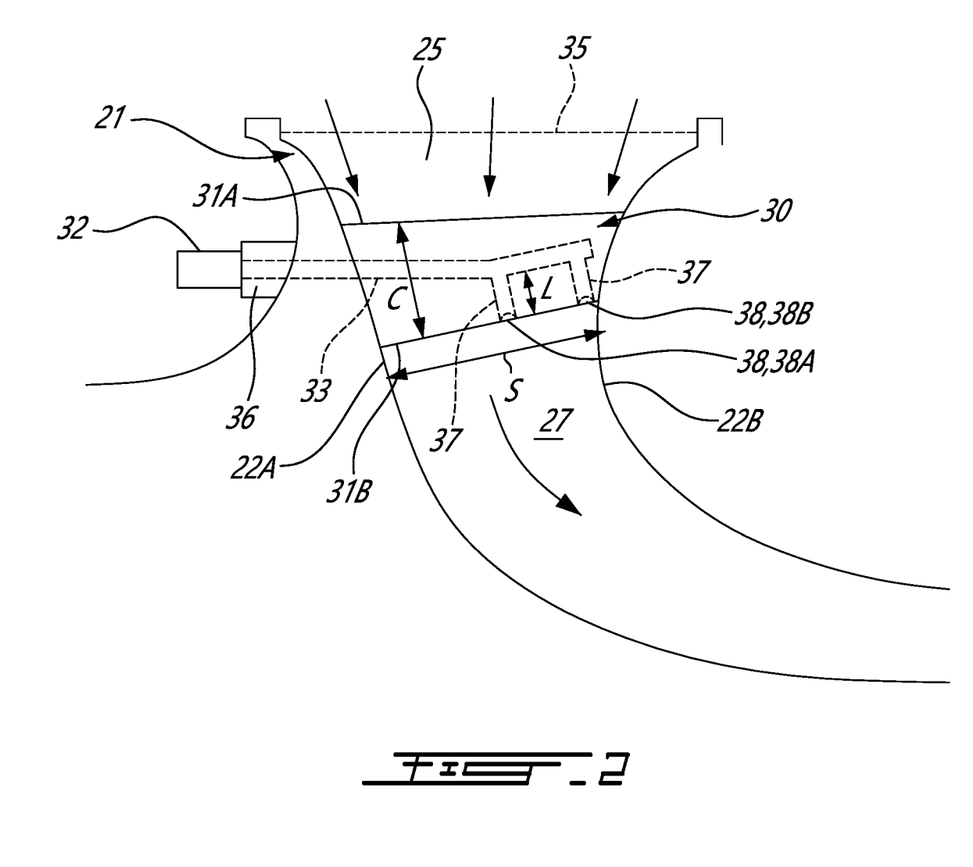
FIG. 2 is an enlarged, schematic cross-sectional view of region II in FIG. 1A

Referring to FIG. 2, one or more of the struts 30 has one or more internal strut passages 33. Each strut passage 33 is a volume positioned within the body of the strut 30 that is sealed-off from the flow of air along the external surfaces of the strut 30. The strut passage 33 allows for air to flow through the interior of the strut 30 in order to measure a static pressure at a location of the strut 30, as explained in greater detail below. In some cases, the strut passage 33 may allow for air to flow through the interior of the strut 30 in order to measure a temperature of the air at a location of the strut 30. In other cases, the strut passage 33 may alternatively be configured for allowing water or the like to flow through the interior of the strut, for instance to act as a wash port to provide water to clean rotors downstream of the inlet duct 21. In some cases, a given strut 30 may include more than one strut passage 33 allowing for various combinations of pressure measurement, air temperature measurement, and the delivery of water.

The strut passage 33 may be formed by drilling, etching, milling or any other operation for forming an internal volume within the material thickness of the strut 30. Referring to FIG. 2, the strut passage 33 extends to, through or is otherwise in fluid communication with, a pressure sensor 32. In other cases, pressure sensor 32 may be replaced by a temperature sensor, or connection means to an appropriate water supply within the engine 10. The fluid communication between the pressure sensor 32 and the strut passage 33 allows the pressure sensor 32 to obtain a pressure reading from the air within the strut passage 33. The pressure sensor 32 is fixedly mounted to the strut 30 or to any adjacent fixed structure using any suitable attachment technique. For example, and referring to FIG. 2, the engine casing includes a boss 36 defining a groove for receiving the pressure sensor 32. The pressure sensor 32 is attached to the engine inlet casing through the boss 36, where the base of the groove of the boss 36 has an opening in fluid communication with the strut passage 33. The boss 36 has an opening in fluid communication with the strut passage 33. The internal strut passage 33 is thus in fluid communication with the pressure sensor 32 when it is mounted to the strut 30. Referring to FIG. 2, the strut passage 33 extends from a root of the strut 30 towards a tip of the strut 30. In an alternate embodiment, the strut passage 33 is defined by a fluid line which extends along an external surface of the strut 30 to the pressure sensor 32. In an alternate embodiment, the pressure sensor 32 is remotely mounted away from the strut 30 and engine casing. In such an alternate embodiment, a tube may extend from the boss 36 and be routed to a port of the pressure sensor 32 that is part of a control system.

The strut 30 has additional components which allow for a pressure reading of the air at locations on the strut 30 to be generated. Referring to FIG. 2, one or more of the struts 30 has multiple ports or taps 38. For instance, the taps 38 can be used as static pressure measurement taps 38 to allow the pressure sensor 32 to generate a reading of the static pressure at the taps 38. In an embodiment, and referring to FIG. 2, the taps 38 are used to obtain a reading of only the static pressure at the location of the taps 38. The static pressure is the pressure applied by the air at the location of the taps 38 when the air has a substantially zero local velocity relative to the taps 38. In an embodiment, the taps 38 exclude, prevent, or reduce the measurement of any dynamic pressure component of the air at the location of the taps 38, where the dynamic pressure is the pressure applied by the air as a result of its motion relative to the taps 38. In an embodiment, the taps 38 contribute to the measurement of a total or ram pressure component of the air at the location of the taps 38, where the total pressure is the addition of static pressure and dynamic pressure at the taps 38. It is understood that in other embodiments, taps 38 may be temperature measurement taps configured for allowing a temperature sensor to generate a reading of the air temperature at the tap 38. Similarly, in other embodiments, taps 38 may be water dispensing taps for water dispensed through the strut passage 33 for cleaning or washing a downstream rotor.

In an embodiment, the taps 38 capture the static pressure of the air at a location of the strut 30 where the dynamic pressure is approximately zero, such that the total pressure of the air at this location of the strut 30 is approximately equal to the local static pressure. Referring to FIG. 2, such a location of the strut 30 may be its trailing edge 31B. The taps 38 are small holes or openings that are spaced apart from each other along the span of the trailing edge 31B, and which are formed in the radius or thickness of the trailing edge 31B. The taps 38 are in fluid communication with the strut passage 33. This allows the pressure sensor 32, which is also in fluid communication with the strut passage 33 and thus in fluid communication with the taps 38, to obtain a reading of the static pressure at the taps 38. In the case of multiple struts 30, the static measurement taps 38 may be positioned on the trailing edge 31B of a top strut 30, or the "top dead center" (TDC) strut 30. In an embodiment, the TDC strut 30 is the only inlet strut 30 of the air inlet 11 that has taps 38 positioned on the trailing edge 31B. Referring to FIG. 2, two taps 38 are shown at the trailing edge 31B of the strut 30, but more or less taps 38 may be used at the trailing edge 31B. Using multiple taps 38 versus using a single tap 38 may help to provide a more reliable static pressure measurement, by helping to bring consistency to the static pressure measurement from an aerodynamics perspective by averaging the static pressure measurement over the multiple taps 38 which makes the measurement value less sensitive to the inlet flow variations at different flight conditions. Using multiple taps 38 versus using a single tap 38 may help to provide redundancy to the static pressure measurement, to allow for continuous measuring of the static pressure in the event that one or more the taps 38 ceases to function or becomes blocked.

By placing the taps 38 on the trailing edge 31B of the strut 30, the accuracy of the static pressure measurement may be improved by avoiding a local dynamic pressure contribution that would introduce error in the static pressure reading. The dynamic pressure contribution is expected to be suppressed or significantly minimized by locating the taps 38 at the trailing edge 31B where the flow over the strut 30 is expected to be detached. Since the dynamic pressure contribution to the total pressure at the taps 38 may be minimal along the trailing edge 31B, the static pressure measurement at the trailing edge 31B may be used to determine the total pressure representative of the inlet pressure at the inlet of the compressor section 12, sometimes referred to as the "P1" pressure in aircraft engines 10. This P1 compressor inlet pressure may be more accurately captured using static pressure and may better resist the effects of inlet total pressure distortion that may reduce the accuracy of a system which directly measures the total pressure (i.e. such as a system using a pitot tube).

Positioning the static pressure measurement taps 38 on the trailing edge 31B helps to orient the taps 38 away from the general direction of the flow of air over the strut 30, and thereby decreases the likelihood that a dynamic pressure component will be added to the static pressure measurement even in scenarios where the flow or air remains attached. Positioning the static pressure measurement taps 38 on the trailing edge 31B may also be beneficial from an icing perspective. Having two or more dedicated ports/taps 38 for predicting P1 provides redundancy, because multiple pressure measurement taps 38 on the trailing edge 31B lowers the risk that ice will block all of the static pressure measurement taps 38 and prevent a proper reading of static pressure. Considering the redundancy and the low icing risk because the taps 38 are located on the trailing edge 31B rather than along the leading edge 31B which is more prone to icing, the taps 38 may not need to be located in the vicinity of a heat source. This may be beneficial for struts 30 used in radial air inlets 11, such as those shown in FIGS. 1A-1B, which may not have a dedicated de-icing capability and rely instead on an upstream inlet screen 35 to achieve de-icing. However, in an embodiment, the taps 38 are located in one or more struts 30 through which warm fluid (oil and/or air) passes through, and/or are in close proximity to a warmer bearing cavity. For example, the strut 30 may be a top strut 30, or a "top dead center" (TDC) strut 30. The TDC strut 30 is located at the 12 o'clock position when the aircraft engine 10 is mounted on the aircraft. The TDC strut 30 is located at the highest vertical position of all the struts 30 when the aircraft engine 10 is mounted on the aircraft. The TDC strut 30 benefits from some heating, such as by an oil pipe located close to the taps 38 which is used to transport used, warmed oil back to an oil tank. Alternatively, in the embodiment where the TDC strut 30 is present through an axial air inlet 11, such as the one shown in FIG. 1C, the taps 38 along the trailing edge 31B may be in proximity to an internal bleed air passage extending through the TDC strut 30. Such heat sources, through conduction, provide additional resiliency for de-icing. The risk of icing blocking the taps 38 may be further reduced by locating the taps 38 in a segment of the trailing edge 31B where ice is less likely to accrete. The taps 38 may be provided with an active pressure tap protection system against icing, including a heating element.

The use of static pressure measurement taps 38 on the trailing edge 31B of the inboard compressor inlet strut 30 to determine the total pressure (e.g. P1), as part of an engine control system, helps to accurately calculate the engine inlet, mass-averaged total pressure P1 over a range of engine conditions by measuring the static pressure at specific locations. The location of two or more static pressure taps 38 on the engine inlet case helps to provide means to measure the aerodynamically averaged pressure of those taps 38 and to determine the total pressure P1 from the static pressure measurements, and thus helps to provide a mass flow averaged total pressure that is representative of the pressure entering the compressor section 12.

The use of static pressure measurement taps 38 on the trailing edge 31B of the inboard compressor inlet strut 30 helps to improve P1 determination due to the accuracy and robustness of measuring static pressure at the trailing edge 31B of the inlet strut 30, when compared to other techniques used to estimate the inlet total pressure in flight. These other techniques, such as estimating P1 using ambient atmospheric pressure or an aircraft total pressure (pitot), do not capture the effect on the compressor inlet pressure of various operational or installation effects such as inlet pressure losses due to icing, variations in angle of attack, inlet by-pass flow, inertial particle separators, inlet barrier filters, and/or left/right/center installation of the engine 10 on the aircraft. The use of static pressure measurement taps 38 on the trailing edge 31B of the inboard compressor inlet strut 30 determines the static pressure downstream of many or all of these operational or installation effects, and consequently helps to provide a more accurate input of P1 to the engine control system by measuring at a location very close to the inlet of the compressor section 12, or at a location which can be correlated with high accuracy to the inlet of the compressor section 12. This may help to improve the engine performance, operability and controls system. Examples of control system logics and algorithm which may be improved by such a more accurate input include, but are not limited to: variable guide vane controls, handling bleed valve controls, engine limiting loops, turbine temperature algorithm, power assurance checks, and power settings.

The use of static pressure measurement taps 38 on the trailing edge 31B of the inboard compressor inlet strut 30 allows for determining the total pressure P1 in compressor inlet flows that are distorted, such as those through radial air inlets 11. The total air inlet pressure P1 may be determined indirectly, via the use of the measured static pressure at the taps 38, thereby allowing an accurate measure of static pressure to be converted or correlated reliably to a total pressure value, such as P1.

Referring to FIG. 3, the trailing edge 31B of the strut 30 has multiple spaced apart edge contours 39 (one edge contour shown in FIG. 3). Each edge contour 39 is a localised feature on the trailing edge 31B, and is positioned at one of the taps 38. By "positioned", it is understood that each edge contour 39 is associated with one of the taps 38, and surrounds or encircles the tap 38. The edge contours 39 are cutouts or undercuts into the trailing edge 31B and help the flow over the strut 30 to separate at the trailing edge 31B, thereby contributing to allowing the taps 38 to adequately capture the static pressure at the location of the taps 38. Each edge contour 39 helps to achieve this function by forming, or being defined by, a contour edge wall 39W that is recessed from a baseline surface 31BS of the trailing edge 31B. In addition, the shape of each edge contour 39 may minimize stress concentrations on the strut 30, for instance by avoiding potentially stress-inducing features such as thin walls and sharp edges.

The recession of the contour edge wall 39W may take different forms. For example, and referring to FIG. 3, each contour edge wall 39W is formed as a cutout or undercut into the trailing edge and is defined by a width W, a depth D and inner corner radii R. As shown in FIG. 3, width W extends in a longitudinal or span direction of the trailing edge 31B, while depth D extends into the body of the strut 30 generally in a chordwise direction (i.e. towards the leading edge 31A). As shown in FIG. 3, each contour edge wall 39W may also includes an inner planar wall section 39P that is recessed and parallel to the trailing edge 31B, and a pair of contour edge sidewalls 39S extending inwardly from the trailing edge 31B and meeting at inner rounded corners 39R. In other cases, the contour edge walls 39W may be a fully curved segment, with no defined inner planar wall section 39P or contour edge sidewalls 39S, as will be discussed in further detail below. In the shown case, the depth D of the contour edge wall 39W is normal to the trailing edge 31B. As such, the depth D is constant along a length of the inner planar wall section 39P. Other cut angles may be contemplated, such as depths D that may vary along the length of the inner planar wall section 39P, as will be discussed in further detail below. Similarly, tap passage 37 (defined along tap passage axis 37A and fluidly linking the shown tap 38 to the strut passage 33) may be normal to the trailing edge 31B. In embodiments where multiple edge contours 39 are present on the trailing edge 31B, the edge contours 39 may have like contour edge walls 39W (i.e., with same width W, depth D and corner inner corner radii R), or their contour edge walls 39W may be shaped differently.

The taps 38 are openings defined in the contour edge walls 39W, and the taps 38 are also recessed from the remaining surface 31BS of the trailing edge 31B. Thus, in the configuration of FIG. 3, each contour edge wall 39W is a divot or cut-out of the trailing edge 31B that is localized around the opening in the trailing edge 31B that forms the tap 38. Referring to FIG. 3, the curved contour edge wall 39W spaces the tap 38 from the remaining surface 31BS of the trailing edge 31B, such that a depth distance D greater than zero is defined between the remaining surface 31BS and the tap 38.

The values for the width W, the depth D and inner corner radii R defining each contour edge wall 39W may be selected in relation to a width X of the tap passage 37, which may also correspond to a width of the recessed tap 38, i.e., the opening to the tap passage 37 in the edge contour 39. In cases where the cross-sectional shape of the tap passage 37 is circular, the width X would correspond to a diameter of the tap passage 37 (and a diameter of the recessed tap 38). For instance the width W of a given contour edge wall 39W may be between about 1.25 to 30 times the width X of the recessed tap 38. Preferably, the width W may be between about 2 to 10 times the width X of the recessed tap 38. Similarly, the depth D of a given contour edge wall 39W may be between about 0.5 to 15 times the width X of the recessed tap 38. Preferably, the depth D of the contour edge wall 39W may be between 1 to 4 times the width X of the recessed tap 38. Likewise, the corner radii R of a given contour edge wall 39W may each be between about 0 (i.e., no inner rounded corners 39R) to 15 times the width X of the recessed tap 38. Preferably, the corner radii R of the contour edge wall 39W may each be between about 0.5 to 3 times the width X of the recessed tap. Various combinations of the above measurements may be contemplated. Other measurements for these dimensions may be contemplated as well.

Figure 4:
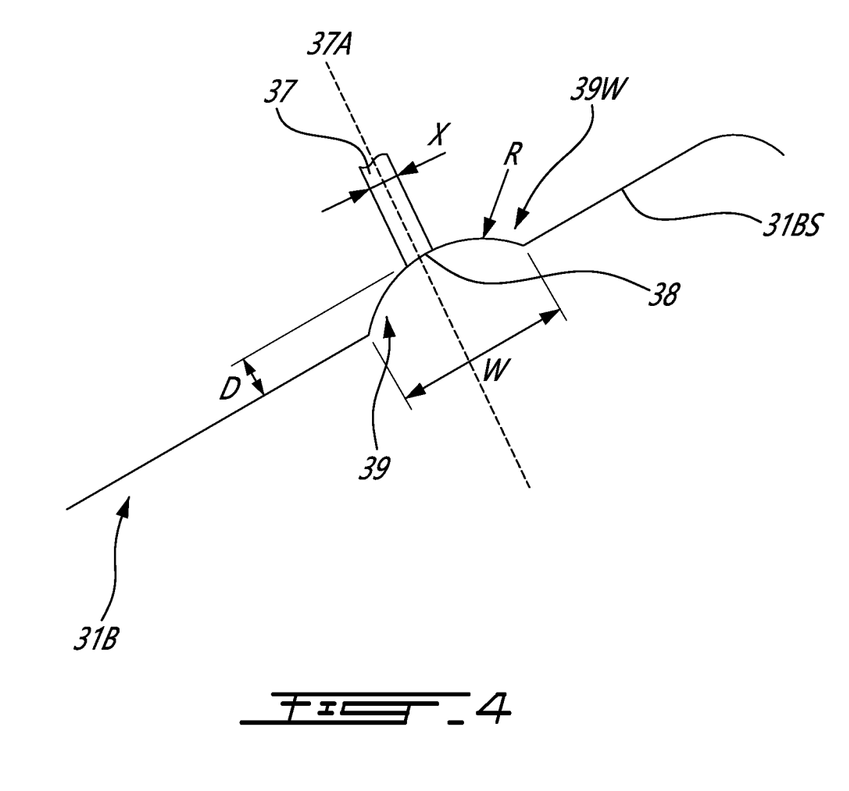
FIG. 4 is a schematic view of another exemplary undercut in a strut.

Referring to FIG. 4, another configuration of the contour edge wall 39W of the edge contours 39 is shown. In the depicted case, the entire contour edge wall 39W is curved, with no defined inner planar wall section 39P or contour edge sidewalls 39S. Instead, a single, curved portion with radius R extends from each junction of the contour edge wall 39W with the trailing edge 31B. Various measurements for the width W and depth D of a given contour edge wall 39W according to this embodiment may be contemplated. For instance, the width W of a given contour edge wall 39W may be between about 1.25 to 30 times the width X of the recessed tap 38. Preferably, the width W may be between about 2 to 10 times the width X of the recessed tap 38. Similarly, the depth D of a given contour edge wall 39W may be between about 0.5 to 15 times the width X of the recessed tap 38. Preferably, the depth D of the contour edge wall 39W may be between 1 to 4 times the width X of the recessed tap 38. Various combinations of the above measurements may be contemplated. Other measurements for these dimensions may be contemplated as well.

Irrespective of its configuration, the edge contour 39 may be referred to as a "drip edge" because its recessed shape may assist in preventing water from running back into the tap 38 and subsequently freezing to thereby block the tap 38. In some situations, the edge contour 39 helps to "sharpen" the trailing edge 31B at the location of the edge contour 39, which may result in water have a greater tendency to be shed from the "sharper" trailing edge 31B and not enter the tap 38, compared to a trailing edge 31B that is more rounded. From an aerodynamics perspective, such a drip edge 39 may also improve the accuracy of the static pressure measurement at the tap 38 by forcing the flow to separate at the trailing edge 31B in the vicinity of the taps 38. For some flight conditions, the inlet flow entering the air passage 27 at a high incidence with respect to the strut 30 may modify the expected location of the flow separation at the trailing edge 31B. Thus, a significant flow angle of attack with respect to the strut 30 may result in a separation delay at the trailing edge 31B. In this situation, the static pressure measurement may be skewed by a dynamic pressure contribution. The edge contour 39 may counter this effect by forcing the flow to separate at the trailing edge 31B in the vicinity of the taps 38. Furthermore, there may be an inherent transient behaviour of the flow that could lead to undesired measurement fluctuations and increase the uncertainty about the measurement quality. The edge contour 39 may help prevent such uncertainty by forcing the flow detachment at the trailing edge 31B.

As described above, the strut passage 33 is in fluid communication with the taps 38 on the trailing edge 31B. This fluid communication arrangement may take different forms. For example, and referring to FIG. 2, the strut 30 includes multiple measurement tap passages 37 that extend within the strut 30 and which are not exposed to the flow of air over the external surfaces of the strut 30. The measurement tap passages 37 may be formed by any suitable technique that removes material from within the strut 30, such as drilling, milling or etching. Each measurement tap passage 37 extends within the strut 30 in a direction toward the trailing edge 31B and one or more of the taps 38, thereby fluid linking those taps 38 to the strut passage 33 and to the pressure sensor 32. Referring to FIG. 2B, the diameter of the measurement tap passages 37 is less than the diameter of the strut passage 33. The measurement tap passages 37 thus establish fluid communication between the taps 38 on the trailing edge 31B and the pressure sensor 32, via the strut passage 33.

The fluid communication between the strut passage 33 and the taps 38 takes another form in an alternate embodiment. In this alternate embodiment, the strut passage 33 is composed of two or more strut passages 33. Each strut passage 33 is in fluid communication with one of the taps 38 via a dedicated measurement tap passage 37. Each strut passage 33 is fluidly connected to its own pressure sensor 32. Thus, in this alternate embodiment, the taps 38 are independent of one another, and each of the taps 38 has their own pressure sensor 32.

In various embodiments, the internal passages 33, 37 of the strut 30 may be shaped or oriented to facilitate fluid drainage within the strut 30, or to reduce or prevent fluid accumulation within the strut 30. For example, the internal strut passage 33 and the measurement tap passages 37 slope toward the center axis 17 of the aircraft engine 10. Such an arrangement may facilitate gravity drainage of any moisture that may accumulate within the strut passage, which may prevent accurate static pressure measurements at the taps 38 if the moisture is left undrained, or if the moisture freezes within the internal passages 33, 37. Other means for facilitating fluid drainage and/or preventing fluid accumulation within the strut 30 may be contemplated as well.

Referring to FIGS. 5-8, various examples of edge contours 39 on the trailing edges 31B of struts 30 are shown. While their shapes, number of taps 38 and number of contour edge walls 39W (i.e., cutouts) may vary, they each respect the various measurement criteria outlined above with reference to FIGS. 3 and 4. FIGS. 5-8 only shown a portion of a given strut 30, and as such the number of edge contours 39 on a given strut 30 may be higher than what is illustratively shown. The various edge contours 39 shown in FIGS. 5-8 are exemplary in nature, and various combinations of the size of each edge contour 39, shape of each edge contour 39, and number of taps 38 disposed in each edge contour may be contemplated.

Figure 5:
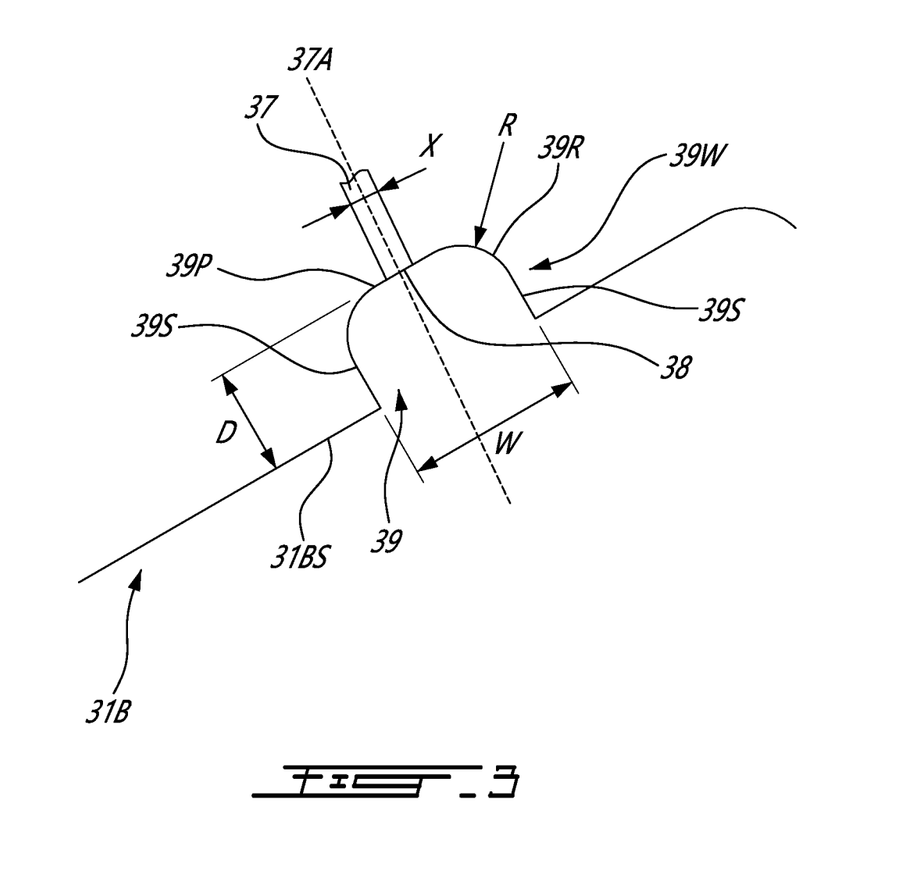
FIG. 5 is an enlarged perspective view of an exemplary strut having undercuts defined along the trailing edge thereof.

FIG. 5 shows a portion of an exemplary trailing edge 31B of a strut 30, with two edge contours 39 visible having like contour edge walls 39W with taps 38 at recessed positions therein. The contour edge walls 39W shown in FIG. 5 are similar to the one shown in FIG. 3, in that they each include a pair of contour edge sidewalls 39S, a pair of inner rounded corners 39R and a inner planar wall section 39P on which the recessed tap 38 is positioned. The spacing between the two edge contours 39 may vary, for instance based on the overall number of edge contours 39 on a given trailing edge 31 of a strut 30. With additional reference to FIG. 3, the depths D of the contour edge walls 39W shown in FIG. 5 are normal to the trailing edge 31B. As such, the inner planar wall sections 39P are parallel to the trailing edge 31B and at a consistent recessed distance (i.e., depth D) from the trailing edge 31B. While not shown in FIG. 5, the tap passages 37 joining the shown taps 38 to the strut passage 33 may extend in a direction normal to the trailing edge 31B as well.

Figure 6A:
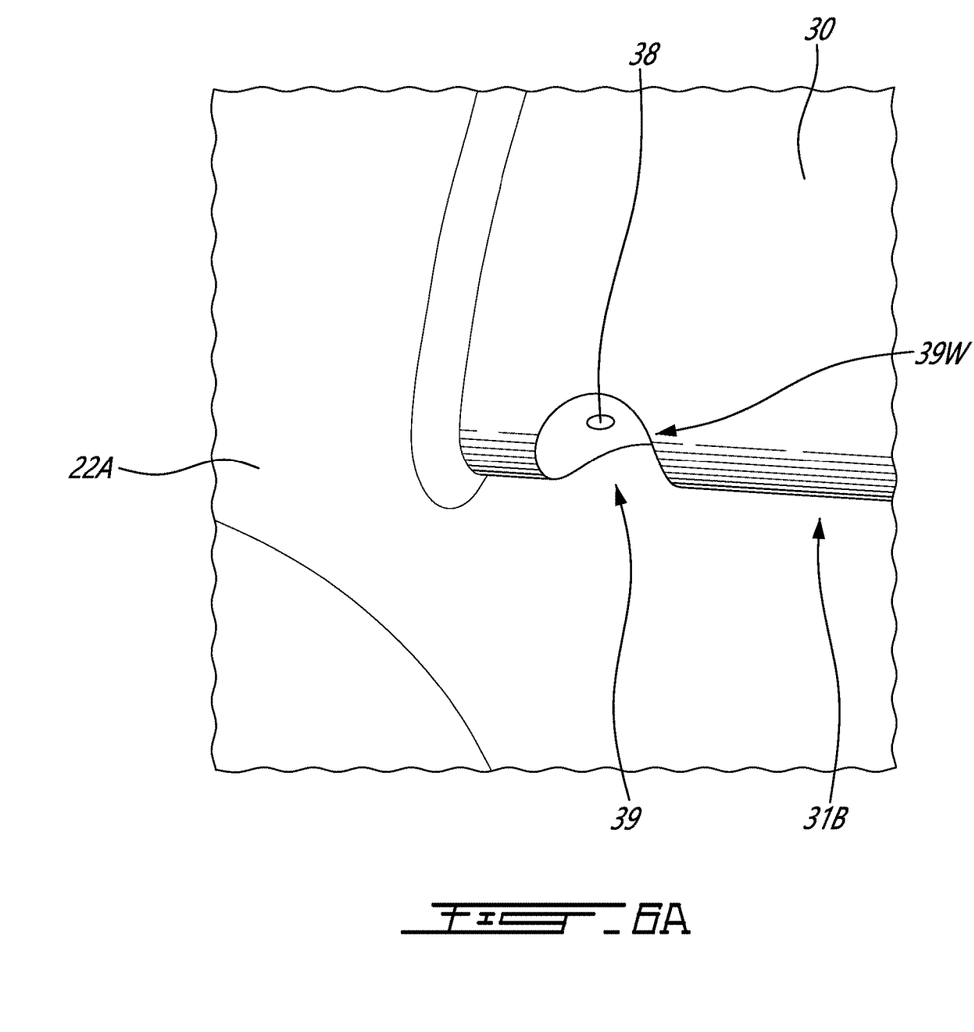
FIGS. 6A and 6B are enlarged perspective and side views, respectively, of another exemplary strut.
Figure 6B:
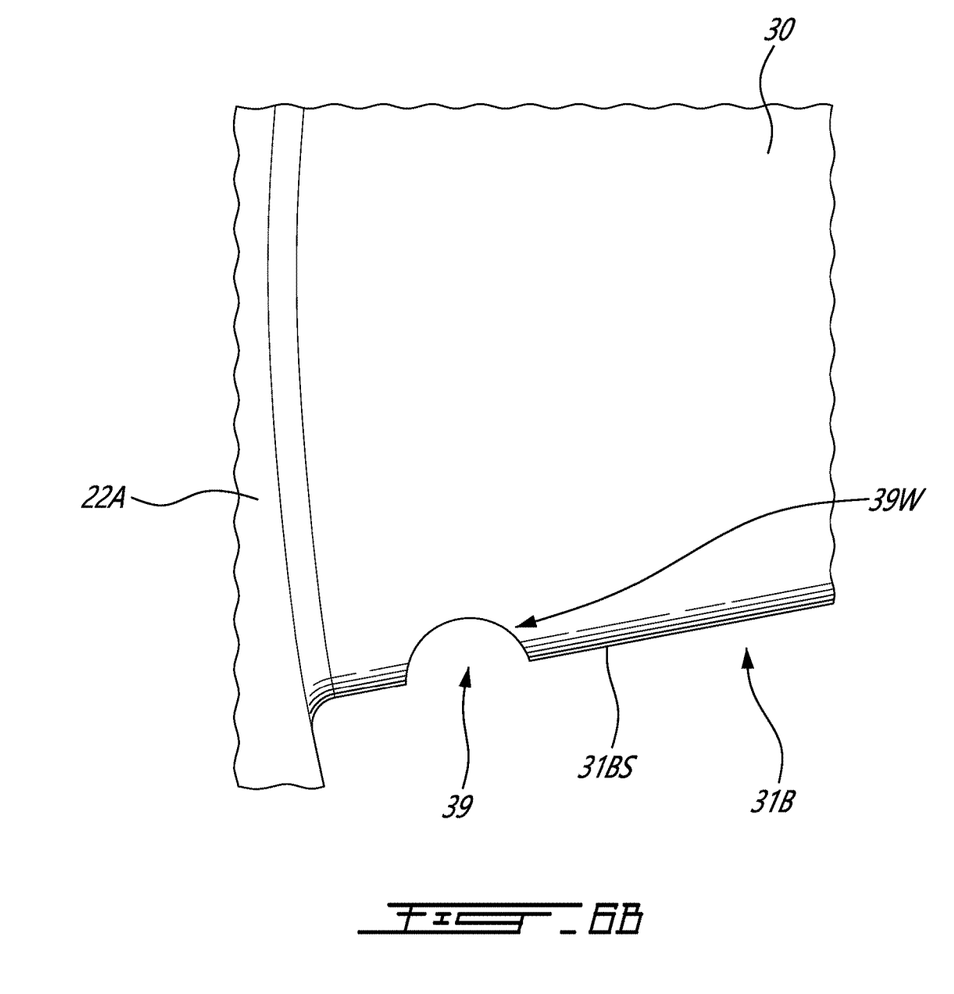

FIGS. 6A-6B shows a portion of an exemplary trailing edge 31B of a strut 30, with a single edge contour 39 visible, although other edge contours 39 may be present along the non-shown portion of the trailing edge 31B. The depicted edge contour 39 resembles the edge contour 39 shown in FIG. 4, i.e. with the contour edge wall 39W defined by a single, curved portion. In other words, the edge contour 39 shown in FIGS. 6A-6B has no defined inner planar wall section 39P or contour edge sidewalls 39S. As such, and with additional reference to FIG. 4, the depth D varies along the width W of the edge contour 39, illustratively increasing then decreasing from one end of the edge contour 39 along the trailing edge 31B to another. In the shown case, the single, curved portion of the contour edge wall 39W is defined by a symmetrical cut into the trailing edge 31B (i.e. about a midpoint of the width W), non-symmetrical cuts may be contemplated as well. Unlike in FIG. 4, the tap 38 depicted in FIGS. 6A-6B is not positioned at a midpoint of the edge contour 39 (i.e., not aligned with a middle of the width W), and as such the tap passage 37 may not extend in a direction normal to the trailing edge 31B. Other positions for the tap 38 may be contemplated.

Figure 7:
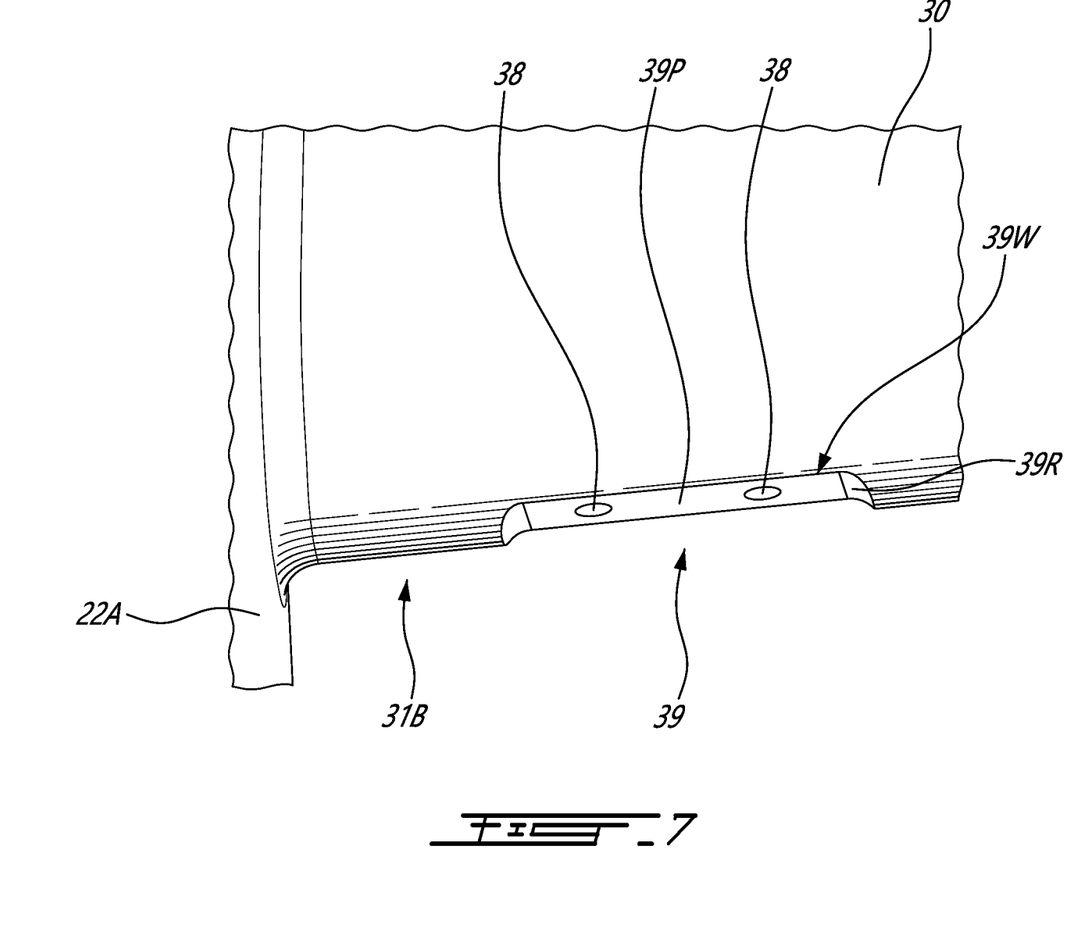
FIG. 7 is an enlarged perspective view of another exemplary strut.

FIG. 7 shows a portion of an exemplary trailing edge 31B of a strut 30, with a single edge contour 39 visible having a pair of recessed taps 38 disposed therein. The remaining portion of the trailing edge 31B of the strut 30 may include additional edge contours 39 similar the one shown (i.e., with two taps disposed therein), or edge contours 39 with single taps disposed therein, as shown in the previous embodiments. The spacing between taps 38 and their relative positioning along the inner planar wall section 39P may vary. For instance, the depicted taps 38 are symmetric about a midpoint along the width W of the shown edge contour 39. In the depicted embodiment, and with additional reference to FIG. 3, the inner rounded corners 39R are dimensioned (inner corner radii R) such that they extend from the inner planar wall section 39P to the trailing edge 31B. In other words, the contour edge wall 39W shown in FIG. 7 does not include contour edge sidewalls 39W. FIG. 7: (inner planar wall section 39P but no contour edge sidewalls 39S). As in FIG. 3, the depth D of the contour edge wall 39W shown in FIG. 7 is normal to the trailing edge 31B. As such, the inner planar wall section 39P is parallel to the trailing edge 31B and at a consistent recessed distance (i.e., depth D) from the trailing edge 31B. While not shown in FIG. 7, the tap passages 37 joining the shown taps 38 to the strut passage 33 may extend in a direction normal to the trailing edge 31B as well.

Figure 8:
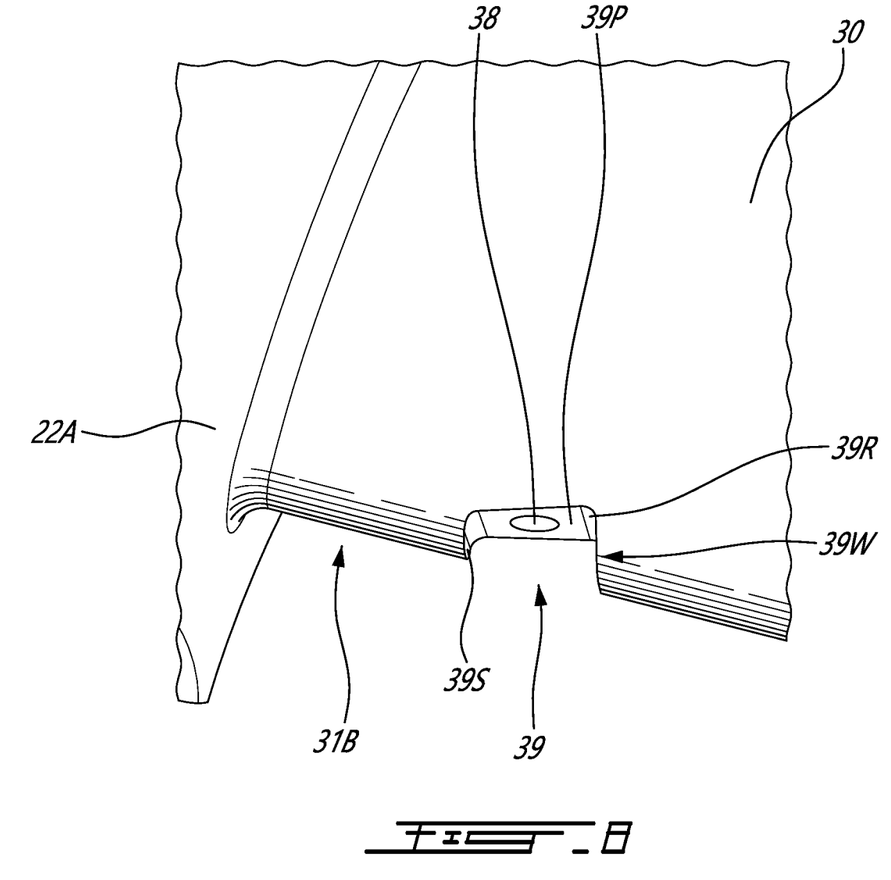
FIG. 8 is an enlarged perspective view of a still further exemplary strut suitable for used in the engines shown in FIGS. 1A-1C.

FIG. 8 shows a portion of an exemplary trailing edge 31B of a strut 30, with a single edge contour 39 visible having a single recessed tap 38 disposed therein. Trailing edge 31B may include additional edge contours 39 as well. The contour edge wall 39W shown in FIG. 8 is similar to those shown in FIGS. 3 and 5, in that it includes a pair of contour edge sidewalls 39S, a pair of inner rounded corners 39R and a inner planar wall section 39P on which the recessed tap 38 is positioned. Likewise, the tap 38 is positioned midway along a length of the inner planar wall section 39P in a same direction as the trailing edge 31B. Unlike the edge contours 39 shown in FIGS. 3 and 5, for instance, the edge contour 39 shown in FIG. 8 has an inner planar wall section 39P that is not parallel to the trailing edge 31B. As such, and with additional reference to FIG. 3, the depth D of the edge contour 39 shown in FIG. 8 varies from one end of the inner planar wall section 39P to another. In addition, while not shown in FIG. 8, the tap passage 37 joining the shown tap 38 to the strut passage 33 may extend in a direction that is non-parallel to the trailing edge 31B as well.

Various methods for forming the edge contours 39 may be contemplated. Different cutting heads may be used in a milling machine to form the undercut in the trailing edge 31B of the trailing edge 31B of the strut 30. The shape of the selected cutting tool and the cutting technique may vary based on the shape of the desired edge contour 39 shape, for instance the edge contour 39 shape of FIG. 3 or 4, or the parallel (shown in FIGS. 5 and 7) or non-parallel (shown in FIG. 8) inner planar wall section 39P. The shape of the selected cutting tool and the cutting technique may additionally affect the various dimensions of the edge contour 39, for instance the width W, the depth D, and/or the inner corner radius R. Depending on the type of cutting tool selected, the edge contour 39 may be formed by removing material (i.e., cutting) along the length of the trailing edge 31B or transverse to the trailing edge 31B. Other considerations for forming the edge contours 39 may be contemplated.

Referring to FIG. 2, the strut 30 has a first tap 38A in fluid communication with a lowermost passage 37, and a second tap 38B in fluid communication with the other passage 37. The first tap 38A is positioned adjacent to one of a root and a tip of the strut 30 and trailing edge 31B, such as adjacent to the root in FIG. 2. The second tap 38B is positioned adjacent to the other of the root and the tip, such as adjacent to the tip of the trailing edge 31B in FIG. 2. The trailing edge 31B has a span S measured between the root and the tip. The distance separating the first and second taps 38A, 38B along the span S of the trailing edge 31B is greater than zero. In an exemplary embodiment, the distance separating the first and second taps 38A, 38B along the span S of the trailing edge 31B is not less than 40% of the span S. Keeping such a minimum spanwise distance between the taps 38A, 38B may minimize their sensitivity and improve the accuracy of averaging the measurement of static pressure at their locations. Alternatively, the distance separating the taps 38A, 38B may be less than 40% of the span S depending on the aerodynamics at the trailing edge 31B for various flight conditions, in order to have a consistently accurate P1 calculation through a wide range of engine powers and flight conditions. Referring to FIG. 2, a length L of each measurement tap passage 37 is defined between a first end at the strut passage 33 and a second end at the trailing edge 31B of the strut 30. A ratio of the length L over a diameter of each of the openings which form the taps 38 is greater than three. Such a ratio may help to reduce any measurement error in the static pressure. From an aerodynamics perspective, such a minimum length-to-diameter ratio may help to minimize the flow turbulence at the taps 38. The radius of each tap 38 may be sized with respect to the radius of the trailing edge 31B, with the dimensions of the contour edge wall 39W dependent on the radius of each tap 38, as discussed above. For example, radius of each tap 38 may be between ⅕ to ½ of the radius of the trailing edge 31B. Having a bigger hole diameter for the tap 38 may make the tap 38 more tolerant to the ingestion of a few water droplets because it mitigates the risk of having some of these water droplets trapped in the measurement tap passage 37 and potentially freeze. Selecting the diameter of the taps 38 may be a trade-off between the aerodynamics and icing requirements on one side, and the mechanical and manufacturing constraints on the other side.

Although the strut 30, the strut passage 33, the edge contour 39, the measurement tap passages 37, and the static pressure measurement taps 38 are described in relation to an inlet strut 30 in a radial air inlet 11, the description and associated advantages of these features shown in FIGS. 2-7 applies mutatis mutandis to a strut 30 present in an axial air inlet 11, such as the one shown in FIG. 10. Similarly, the description and associated advantages of the strut 30, the strut passage 33, the edge contour 39, the measurement tap passages 37, and the static pressure measurement taps 38 shown in FIGS. 2-7 applies mutatis mutandis to the strut 30 present in the radial air inlet 11 of FIGS. 1B, 4A and 4B. In addition, while the present disclosure describes strut passages 30, measurement tap passages 37 and measurement taps 38 in the context of measuring a static pressure at the trailing edge 31B, it is understood that the same tap strut passages 30, measurement tap passages 37 and measurement taps 38 may be applied mutatis mutandis in the context of temperature measurement of the air at the trailing edge 31B, or to provide water (or another suitable cleaning fluid) through the strut passage to wash or clean downstream rotors, as described above. In another embodiment, a strut 30 may include multiple strut passages 33, each with a different function such as pressure measurement, temperature measurement, and/or water delivery.

Referring to FIG. 2, there is disclosed a method of obtaining static pressure in an inlet of a compressor of an aircraft engine. The method includes obtaining the static pressure at spaced-apart locations on a trailing edge of a strut extending across the inlet.

It can be appreciated from the foregoing that at least some embodiments teach a strut in an air inlet of an aircraft engine having a strut passage in fluid communication with a recessed tap in an undercut in the trailing edge of the strut, thereby minimizing the level of stress incurred at the trailing edge of the strut. In particular, the geometry of the undercut in which the recessed tap is disposed may avoid potentially stress-inducing features such as thin walls and sharp edges, thereby minimizing stress concentrations on the strut without negatively affecting the flow of air around the strut or the stiffness of the strut.

In the present disclosure, when a specific numerical value is provided (e.g. as a maximum, minimum or range of values), it is to be understood that this value or these ranges of values may be varied, for example due to applicable manufacturing tolerances, material selection, etc. As such, any maximum value, minimum value and/or ranges of values provided herein (such as, for example only, the width W of a given contour edge wall 39W being between about 1.25 to 30 times the width X of the recessed tap 38), include(s) all values falling within the applicable manufacturing tolerances. Accordingly, in certain instances, these values may be varied by ±5%. In other implementations, these values may vary by as much as ±10%. A person of ordinary skill in the art will understand that such variances in the values provided herein may be possible without departing from the intended scope of the present disclosure, and will appreciate for example that the values may be influenced by the particular manufacturing methods and materials used to implement the claimed technology.

Referring to FIGS. 2-8, there is disclosed a method of forming a passage within a strut extending across at least part of a gas path of an aircraft engine. The method includes removing material from a trailing edge of the strut to form one or more edge contours each defining a contour edge wall recessed from a baseline surface of the trailing edge; and forming an internal strut passage within a body of the strut, the internal strut passage in fluid communication with one or more recessed taps disposed in a respective one of the one or more edge contours.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, while the present technology has been described in the context of an air inlet strut, it is understood that the same principles could be applied to integrate ports or holes in the trailing edge of struts in gas paths at other locations along the engine. Yet further modifications could be implemented by a person of ordinary skill in the art in view of the present disclosure, which modifications would be within the scope of the present technology.

The invention claimed is:

1. An aircraft engine, comprising:
   an air inlet duct; and
   at least one strut having a leading edge and a trailing edge and extending across at least part of the air inlet duct, the at least one strut having a strut passage, the trailing edge having one or more edge contours each defining a contour edge wall recessed from a baseline surface of the trailing edge, the one or more edge contours having a recessed tap in fluid communication with the strut passage, wherein the contour edge wall is a curved segment with a width along the trailing edge, a depth extending inwardly from the trailing edge towards the leading edge, and an inner radius defining the curved segment.

2. The aircraft engine as defined in claim 1, wherein the contour edge wall has a width along the trailing edge, a depth extending inwardly from the trailing edge towards the leading edge, and an inner corner radius at a pair of inner rounded corners.

3. The aircraft engine as defined in claim 2, wherein the width of the contour edge wall is between 1.25 to 30 times a width of the recessed tap, the depth of the contour edge wall is between 0.5 to 15 times the width of the recessed tap, and the inner corner radius of the contour edge wall is between 0 to 15 times the width of the recessed tap.

4. The aircraft engine as defined in claim 3, wherein the width of the contour edge wall is between 2 to 10 times the width of the recessed tap, the depth of the contour edge wall is between 0.5 to 4 times the width of the recessed tap, and the inner corner radius of the contour edge wall is between 0.5 to 3 times the width of the recessed tap.

5. The aircraft engine as defined in claim 2, wherein the recessed tap is aligned with a center of an associated one of the one or more edge contours relative to the width of the contour edge wall of the associated one of the one or more edge contours along the trailing edge.

6. The aircraft engine as defined in claim 2, wherein the depth of the contour edge wall varies in magnitude along the width thereof.

7. The aircraft engine as defined in claim 1, wherein the width of the contour edge wall is between 1.25 to 30 times a width of the recessed tap, and the depth of the contour edge wall is between 0.5 to 15 times the width of the recessed tap.

8. The aircraft engine as defined in claim 7, wherein the width of the contour edge wall is between 2 to 10 times the width of the recessed tap, and the depth of the contour edge wall is between 0.5 to 4 times the width of the recessed tap.

9. The aircraft engine as defined in claim 1, further comprising one or more of a pressure sensor, a temperature sensor, or a wash port disposed proximate the air inlet duct adjacent the at least one strut, the one or more of the pressure sensor, temperature sensor or wash port in fluid communication with the recessed tap in the one or more edge contours via the strut passage.

10. A strut extending across at least part of a gas path of an aircraft engine, the strut comprising:
   a strut body having a leading edge and a trailing edge; and
   an internal strut passage within the strut body, the internal strut passage in fluid communication with one or more recessed taps disposed in respective one or more edge contours in the trailing edge defining a contour edge wall recessed from a baseline surface of the trailing edge, wherein the contour edge wall is a curved segment with a width along the trailing edge, a depth extending inwardly from the trailing edge towards the leading edge, and an inner radius defining the curved segment.

11. The strut as defined in claim 10, wherein the one or more recessed taps are fluidly connected to the internal strut passage via a tap passage extending in a direction normal to the trailing edge.

12. The strut as defined in claim 11, wherein the contour edge wall has a width along the trailing edge of between 1.25 to 30 times a width of the tap passage.

13. The strut as defined in claim 12, wherein the width of the contour edge wall is between 2 to 10 times the width of the tap passage.

14. The strut as defined in claim 11, wherein the contour edge wall has a depth extending inwardly from the trailing edge towards the leading edge, the depth between 0.5 to 15 times a width of the tap passage.

15. The strut as defined in claim 14, wherein the depth of the contour edge wall is between 0.5 to 4 times the width of the tap passage.

16. The strut as defined in claim 11, wherein the contour edge wall has an inner corner radius at a pair of inner rounded corners, the inner corner radius between 0 to 15 times a width of the tap passage.

17. The strut as defined in claim 16, wherein the inner corner radius at the pair of inner rounded corners of the contour edge wall is between 0.5 to 3 times the width of the tap passage.

18. The strut as defined in claim 10, wherein the one or more recessed taps are aligned with a center of an associated one of the one or more edge contours relative to a width of the contour edge wall of the associated one of the one or more edge contours along the trailing edge.

19. An aircraft engine, comprising:
   an air inlet duct; and
   at least one strut having a leading edge and a trailing edge and extending across at least part of the air inlet duct, the at least one strut having a strut passage, the trailing edge having one or more edge contours each defining a contour edge wall recessed from a baseline surface of the trailing edge, the one or more edge contours having a recessed tap in fluid communication with the strut passage, wherein the contour edge wall has a width along the trailing edge and a depth extending inwardly from the trailing edge towards the leading edge, the depth of the contour edge wall varying in magnitude along the width of the contour edge wall.

* * * * *